United States Patent
Kaido et al.

[11] Patent Number: 5,851,323
[45] Date of Patent: Dec. 22, 1998

[54] PNEUMATIC TIRE WITH AIR PERMEATION PREVENTIVE LAYER

[75] Inventors: Hiroyuki Kaido; Kazuto Yamakawa; Jiro Watanabe; Zenichiro Shida; Yoshiaki Hashimura, all of Hiratsuka, Japan

[73] Assignee: The Yokohama Rubber Co., Ltd., Tokyo, Japan

[21] Appl. No.: 750,022

[22] PCT Filed: Mar. 21, 1996

[86] PCT No.: PCT/JP96/00737

§ 371 Date: Feb. 19, 1997

§ 102(e) Date: Feb. 19, 1997

[87] PCT Pub. No.: WO96/30221

PCT Pub. Date: Mar. 10, 1996

[30] Foreign Application Priority Data

Mar. 24, 1995 [JP] Japan ................................. 7-066274
Nov. 15, 1995 [JP] Japan ................................. 7-296892

[51] Int. Cl.⁶ ...................................................... B60C 5/14
[52] U.S. Cl. ........................... 152/510; 152/548; 152/549
[58] Field of Search ................................. 152/510, 511, 152/548, 549; 156/87; 425/52, 53, 812

[56] References Cited

U.S. PATENT DOCUMENTS

| | | | |
|---|---|---|---|
| 2,678,468 | 5/1954 | Smith | 425/53 |
| 4,754,793 | 7/1988 | Mohammed | 152/510 |
| 4,928,741 | 5/1990 | Rye et al. | 152/510 |
| 5,062,781 | 11/1991 | Szyms et al. | 425/52 |
| 5,091,467 | 2/1992 | Beers | 152/510 |
| 5,280,817 | 1/1994 | Liu et al. | 152/510 |
| 5,443,104 | 8/1995 | Dollinger et al. | 152/510 |

FOREIGN PATENT DOCUMENTS

| | | | |
|---|---|---|---|
| 633152 | 1/1995 | European Pat. Off. | 152/510 |
| 4126451 | 2/1993 | Germany | 152/510 |
| 60-71210 | 4/1985 | Japan | 425/52 |
| 63-89805 | 6/1988 | Japan . | |
| 4-11502 | 1/1992 | Japan . | |
| 4-5104 | 1/1992 | Japan | 152/510 |
| 4-90902 | 3/1992 | Japan . | |
| 5-50807 | 3/1993 | Japan . | |

*Primary Examiner*—Geoffrey L. Knable
*Attorney, Agent, or Firm*—Finnegan, Henderson, Farabow, Garrett & Dunner, L.L.P.

[57] ABSTRACT

A pneumatic tire has an air permeation preventive layer comprising a film composed of a polymer composition containing a thermoplastic resin or a blend of a thermoplastic resin and an elastomer having an air permeation coefficient of not more than $25 \times 10^{-12}$ cc·cm/cm²·sec·cmHg and a Young's modulus of 1 to 1000 MPa which is arranged so as to substantially cover the inner surface of the tire at least in the range of 20 mm from the position of the two ends of the belt to the direction of the crown center and is also arranged so as to substantially cover the inner surface of the tire at the crown center side of a position a maximum of 20 mm from the position of the two ends of the belt to the direction of the bead portion and applies an air permeation preventive layer comprised of rubber so as to substantially cover the rest of the inner surface of the tire and using an air permeation preventive layer having an actual elongation at break of at least 15% in the circumferential direction and radial direction at the tire side portions in a range of at least 0.5H to 0.65H of the tire sectional height H.

15 Claims, 6 Drawing Sheets

PRIMARY MOLDING → SECONDARY MOLDING

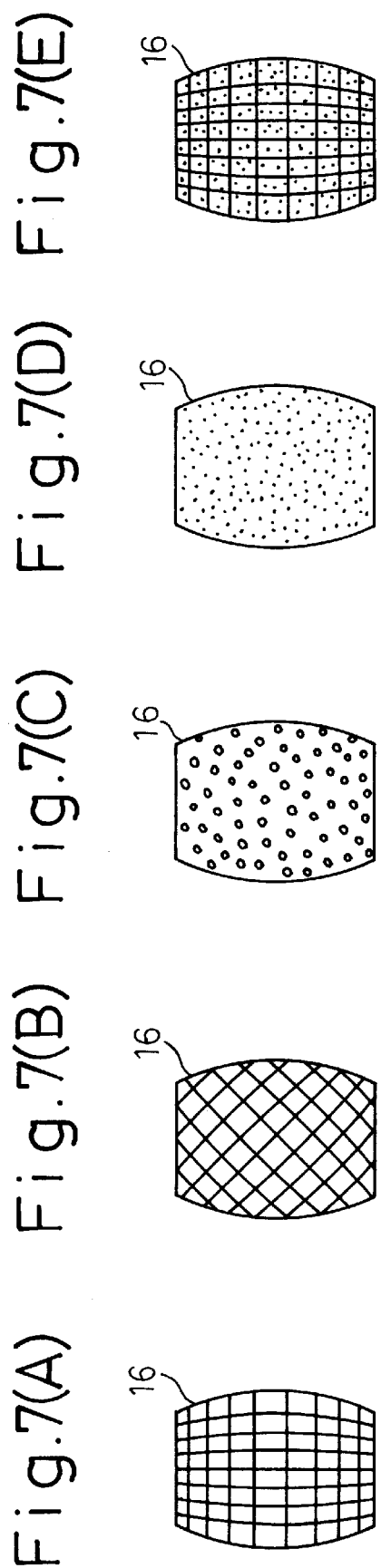

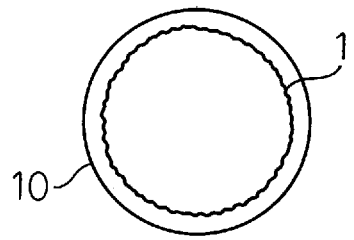
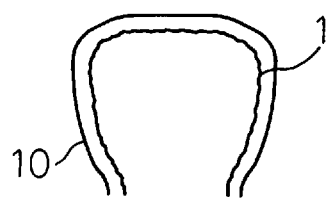
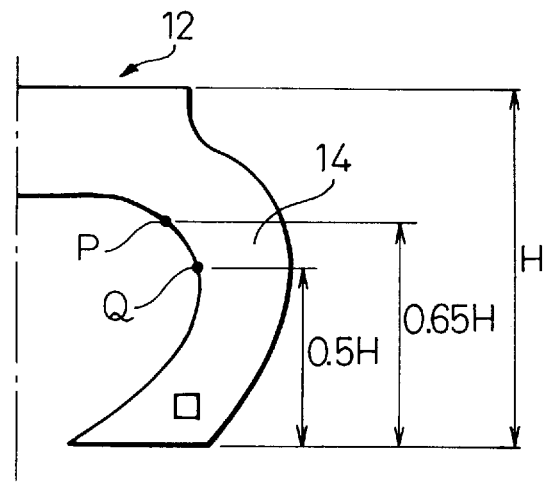
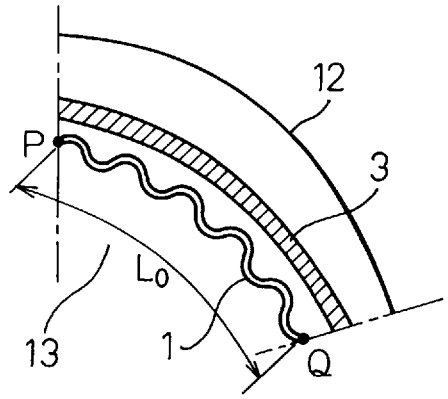

PNEUMATIC TIRE WITH AIR PERMEATION PREVENTIVE LAYER

TECHNICAL FIELD

The present invention relates to a pneumatic tire, more particularly, it relates to a pneumatic tire which is lightened in weight without detracting from the durability of the belt portion, without allowing damage due to local strain caused near the carcass cord in the tire side portion, and without detracting from the retention of air pressure due to fine cracks caused in the inner liner layer due to deformation of the tire at the time of use.

BACKGROUND ART

Reduction of fuel consumption is one of the major technical issues in automobiles. As one of the means for solving this issue, demands have been strongly increased for reduction of the weight of pneumatic tires. From this viewpoint, tires using an air permeation preventive layer made by a film composed of a plastic or plastic/rubber have been proposed to lighten the tire weight (for example, see Japanese Unexamined Patent Publication (Kokai) No. 5-329961 etc.)

An inner liner layer or other air permeation preventive layer composed of a halogenated butyl rubber or other rubber having a low air permeability is conventionally provided at the inner surface of the pneumatic tire. However, a halogenated butyl rubber has a large hysteresis loss, and therefore, after vulcanization of the tire, when rippling is caused in the rubber of the inner surface of the carcass layer and the air permeation preventive layer, the air permeation preventive layer deforms along with deformation of the carcass layer. Thus, there is the problem of an increase in the rolling resistance. Therefore, in general, a rubber sheet called a "tie rubber" having a small hysteresis loss has been inserted between the air permeation preventive layer (halogenated butyl rubber) and rubber of the inner surface of the carcass layer for joining the two. Accordingly, in addition to the thickness of the air permeation preventive layer of the halogenated butyl rubber, the thickness of the tie rubber is added and the layer overall becomes a thickness of over 1 mm (1,000 μm). As a result, this has become a factor increasing the weight of the final tire.

Techniques have been proposed for using various materials in place of the low air permeability rubber such as butyl rubber as the air permeation preventive layer of a pneumatic tire. For example, Japanese Unexamined Patent Publication (Kokai) No. 6-40207 proposes providing an air permeation preventive layer at the inside of the tire by laminating a low air permeability layer composed of a polyvinylidene chloride film or ethylene-vinyl alcohol copolymer film and an adhesive layer composed of a polyolefinic film, aliphatic polyamide film, or polyurethane film to form a thin film and laminating that thin film on the inner surface of a green tire composed of unvulcanized rubber so that the adhesive layer contacts the carcass layer, then vulcanizing and molding the green tire. By using this multilayer film for the air permeation preventive layer, it is possible to reduce the weight of the tire without detracting from the retention of the air pressure. However, when forming the inner liner or other air permeation preventive layer from such a thermoplastic multilayer film, there is insufficient elongation of the thermoplastic film in the face of the repeated deformation at the time of tire use, and therefore, the film cannot keep up with this deformation and a large number of cracks occur in the film. As a result, there is a risk of a decline in the sealability of the air.

On the other hand, as shown in FIG. 1, at the air permeation preventive layer 1 of the tire, the lift h at the time of the secondary molding of the tire causes the circumferential length of the bottom portion 2 of the belt to become longer by the amount of the lift. The gauge becomes thinner by that amount, and therefore, air permeates from that portion and the problem occurs of a drop in durability of the belt portion due to oxygen deterioration. Accordingly, the practice has been to extrude the belt thicker giving consideration to the thinning of the gauge or to extrude thicker just the bottom portion of the belt providing the larger amount of lift as proposed in Japanese Unexamined Patent Publication (Kokai) No. 4-77243. In either case, however, the mass of the tire increases and the problem arises of not being able to respond to demands for lighter weight.

Further, Japanese Unexamined Patent Publication (Kokai) No.p 5-329961 proposes to use, as the air permeation preventive layer, a film made of a plastic or plastic/rubber blend. In this case, the resistance to air permeation is good and it is possible to reduce the weight by a thinner gauge.

However, a film made of a plastic or plastic/rubber blend is inferior to rubber in terms of fatigue resistance, and therefore, there was a risk of problems of cracking, peeling, etc. occurring due to the local strain produced near the carcass cord portion in the pneumatic tire, in particular, at the side portions causing the large deformation.

Accordingly, the object of the present invention is to provide a pneumatic tire which is improved in the durability of the belt portion of the pneumatic tire and is lightened in weight.

Another object of the present invention is to provide a pneumatic tire which solves the problem in the conventional pneumatic tire using a thermoplastic film for the air permeation preventive layer of the film not being able to sufficiently track the repeated deformation during tire use, and therefore, suffering from the occurrence of a large number of cracks in the film and a reduction in the sealability of the air and which has an excellent retention of air pressure without suffering from cracks etc. due to the repeated deformation at the time of tire use even when using a thermoplastic film for the inner liner layer.

Further, object of the present invention is to provide a pneumatic tire which solves the problem of the risk of damage to the air permeation preventive layer of the present invention due to local strain caused near the carcass cord portion in the side portion in particular if a plastic or a plastic/rubber blend adjoins the carcass layer of the pneumatic tire, since this material is inferior in fatigue resistance compared with rubber and which is lightened in weight without risk of damage to the air permeation preventive layer of the pneumatic tire.

SUMMARY OF THE INVENTION

In accordance with the present invention, there is provided a pneumatic tire using an air permeation preventive layer comprising a film composed of a polymer composition containing a thermoplastic resin or a blend of a thermoplastic resin and an elastomer having an air permeation coefficient of not more than $25 \times 10^{-12}$ cc·cm/cm$^2$·sec·cmHg and a Young's modulus of 1 to 1000 MPa which is arranged so as to substantially cover the inner surface of the tire at least in the range of 20 mm from the position of the two ends of the belt to the direction of the crown center and is also arranged so as to substantially cover the inner surface of the tire at the crown center side of a position a maximum of 20 mm from the position of the two ends of the belt to the direction of the bead portion, and using an air permeation preventive layer having an actual elongation at break of at least 15% in the circumferential direction and radial direction at the tire side portions in a range of at least 0.5H to 0.65H of the tire sectional height H.

In accordance with the present invention, there is also provided a pneumatic tire which arranges an air permeation preventive layer composed of a film of a polymer composition containing a thermoplastic resin or a blend of a thermoplastic resin and an elastomer having an air permeation coefficient of not more than $25\times10^{-12}$ cc·cm/cm²·sec·cmHg and a Young's modulus of 1 to 1000 MPa is also arranged at the tire side portions at least in the range of 0.5H to 0.65H of the tire sectional height H and is provided with unevenness on its surface so as to make the amount of elongation of shape of the air permeation preventive layer in the circumferential direction and radial direction in the range of 0.5H to 0.65H of the tire sectional height H at least 5% and to make the amount of elongation of the material 10%.

In accordance with the present invention, there is still further provided a pneumatic tire comprising an air permeation preventive layer comprising a film composed of a polymer composition containing a thermoplastic resin or a blend of a thermoplastic resin and an elastomer having an air permeation coefficient of not more than $25\times10^{-12}$ cc·cm/cm²·sec·cmHg and a Young's modulus of 1 to 1000 MPa which is arranged so as to substantially cover the inner surface of the tire at least in the range of 20 mm from the position of the two ends of the belt to the direction of the crown center and is also arranged so as to substantially cover the inner surface of the tire at the crown center side of a position at a maximum of 20 mm from the position of the two ends of the belt to the direction of the bead portion, wherein the thickness t of the rubber at the inside of the carcass cord is made at least in the range of 0.5H to 0.65H with respect to the tire sectional height H at least 0.3 mm, and, in this range, a film-shaped air permeation preventive layer composed of a polymer composition containing a thermoplastic resin or a blend of a thermoplastic resin and elastomer having an air permeation coefficient in that range of not more than $25\times10^{-12}$ cc·cm/cm²·sec·cmHg and a Young's modulus of 1 to 200 MPa is arranged.

BRIEF DESCRIPTION OF THE DRAWINGS

The present invention will be explained in further detail below with reference to the drawings.

FIGS. 7(A) to FIG. 7(E) are schematic views of several examples of patterns of unevenness of the surface of a bladder used for fabricating the air permeation preventive layer of a pneumatic tire according to the second aspect of the present invention.

FIGS. 8(A) and (B) are views schematically showing the sectional shape of the present invention according to the second aspect of the present invention, where (A) shows the circumferential direction and (B) shows the sectional direction.

FIG. 9 is a view of the portion PQ given the uneven inner liner layer according to the second aspect of the present invention.

FIG. 10 is a view schematically showing the method for finding the amount of elongation of shape ($E_1$) of the uneven inner liner layer according to the second aspect of the present invention.

DETAILED DESCRIPTION OF THE INVENTION

Figure 1:
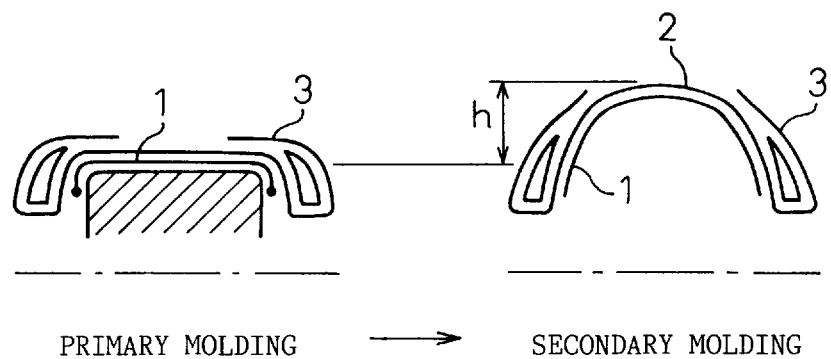
FIG. 1 is a view of the state where the circumferential length of the air permeation preventive layer at the bottom of the belt becomes longer due to the lift at the time of molding a conventional tire.

The film constituting the air permeation preventive layer of the pneumatic tire according to the present invention has an air permeation coefficient of not more than $25\times10^{-12}$ cc·cm/cm²·sec·cmHg, preferably not more than $5\times10^{-12}$ cc·cm/cm²·sec·cmHg; the film used under the belt of the tire has a Young's modulus of 1 to 1000 MPa, preferably 1 to 500 MPa, more preferably 10 to 300 MPa; the Young's modulus of the air permeation preventive layer, in the case of making the thickness t of the rubber at the inside of the carcass cord used in the range of 0.5H to 0.65H with respect to the tire sectional height H at least 0.3 mm, is 1 to 350 MPa, preferably 10 to 200 MPa, and the thickness of the film is preferably at least 0.02 mm from the viewpoint of the moldability and preferably 1.1 mm from the viewpoint of lightening the weight, more preferably 0.05 to 0.2 mm. An air permeation coefficient of more than $25\times10^{-12}$ cc·cm/cm²·sec·cmHg is not preferred from the viewpoint of lightening the weight of the pneumatic tire. Further, if the Young's modulus is too low, the moldability is reduced due to the occurrence of wrinkles and elongation at the time of molding the tire, while conversely if too high, there are problems in the durability. These are consequently not preferred.

The thermoplastic resin may be made any material having an action preventing permeation of air. Examples of such a thermoplastic resin include, for example, the following thermoplastic resins and any polymer mixtures thereof, or mixtures thereof with elastomers etc.

Polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/N66), nylon 6/66/610 copolymer (N6/66/610), nylon MXD (MXD6), nylon 6T, nylon 6/6T copolymer, nylon 66/PP copolymer, and nylon 66/PPS copolymer) and N-alkoxyalkylates of these, for example, methoxymethylates of 6-nylon, methoxymethylates of 6-610-nylon, and methoxymethylates of 612-nylon, polyester resins (for example, polybutylene terephthalate (PBT), polyethylene terephtalate (PET), polyethylene isophthalate (PEI), PET/PEI copolymers, polyacrylate (PAR), polybutylene naphthalate (PBN), liquid crystal polyester, polyoxyalkylene diimido diacid/polybutylate terephthalate copolymer, and other aromatic polyesters), polynitrile resins (for example, polyacrylonitrile (PAN), polymethecrylonitrile, acrylonitrile/styrene copolymer (AS), methacrylonitrile/styrene copolymers, methacrylonitrile/styrene/butadiene copolymers), polymethacrylate resins (for example, polymethyl methacrylate (PMMA), polyethyl methacrylate), polyvinyl resins (for example, vinyl acetate, polyvinyl alcohol (PVA), vinyl alcohol/ethylene copolymer (EVOH), polyvinylidene chloride (PDVC), polyvinyl chloride (PVC), polyvinyl/polyvinylidene chloride copolymer, polyvinylidene chloride/methyl acrylate copolymer, vinylidene chloride/acrylonitrile copolymer), cellulose resins (for example, cellulose acetate, cellulose acetobutyrate), fluororesins (for example, polyvinylidene fluoride (PVDF), polyvinyl fluoride (PVF), polychlorofluoroethylene (PCTFE), tetrafluoroethylene/ethylene copolymer), imide resins (for example, aromatic polyimides (PI)), etc. may be mentioned.

The elastomer which may be blended with the above thermoplastic resin is not particularly limited so long as the blend has the above air permeation coefficient and Young's modulus. Examples are as follows:

Diene rubbers and their hydrogenated products thereof (for example, NR, IR, epoxylated natural rubber, SBR, BR (high cis-BR and low-cis BR), NBR, hydrogenated NBR, hydrogenated SBR), olefin rubbers (for example, ethylene propylene rubber (EPDM, EPM), maleic acid-modified ethylene propylene rubber (M-EPM), IIR, isobutylene and aromatic vinyl or diene monomer copolymers, acryl rubbers (ACM), ionomers), halogenated rubbers (for example, Br-IIR, Cl-IIR, bromide of isobutylene paramethylstyrene copolymer (Br-IPMS), CR, chlorohydrin rubber (CHR), chlorosulfonated polyethylene (CSM), chlorinated polyethylene (CM), maleic acid-modified chlorinated polyethylene (M-CM), silicone rubbers (for example, methylvinyl silicone rubber, dimethyl silicone rubber, methylphenylvinyl silicone rubber), sulfur-containing rubber (for example, polysulfide rubber), fluororubber (for example, vinylidene fluoride rubber, fluorine-containing vinylether rubber, tetrafluoroethylene propylene rubber, fluorine-containing silicone rubber, fluorine-containing phosphazen rubber), thermoplastic elastomers (for example, styrene elastomers, olefin elastomers, ester elastomers, urethane elastomers, polyamide elastomers), etc. may be mentioned.

When the compatibilities of specific thermoplastic resins and elastomer components differ, it is preferable to make the two compatible using a suitable compatibilizer as a third component. By mixing a compatibilizer into the system, the surface tension of the thermoplastic resin and elastomer component falls and as a result the size of the rubber particles forming the dispersion layer become finer, and therefore the characteristics of the two components becomes more effectively expressed. As such a compatibilizer, in general it is possible to adopt the structure of a copolymer having the structure of both or either or the thermoplastic resin and elastomer component or a copolymer having an epoxy group, carbonyl group, halogen group, amine group, oxazoline group, hydroxy group, etc. capable of reacting with the thermoplastic resin or elastomer component. These may be selected according to the type of the thermoplastic resin and elastomer component to be mixed, but as the usually used ones mention may be made of styrene/ethylene-butylene block copolymers (SEBS) and their maleic acid modified products, EPDM, EPDM/styrene or EPDM/ acrylonitrile graft copolymers and their maleic acid modified products, styrene/maleate copolymers, reactive phenoxine, etc. The amount of the compatibilizer blended in is not particularly limited, but preferably is 0.5 to 10 parts by weight per 100 parts by weight of the polymer components (total of thermoplastic resin and elastomer components).

The ratio of the specific thermoplastic resin (A) and elastomer component (B) in the case of blending a thermoplastic resin and elastomer is not particularly limited, but may be suitably decided by the balance of the thickness of the film, the resistance to air permeation, and the pliability, but the preferable range is an (A)/(B) of 10/90 to 90/10, more preferably 20/80 to 85/15.

The polymer composition according to the present invention may optionally include, in addition to the above necessary polymer components, a compatibilizer polymer or other polymer to an extent not detracting from the necessary properties of the polymer composition for a tire according to the present invention. The purpose of mixing in other polymers may be to improve the compatibility of the thermoplastic resin and elastomer component, to improve the film-forming capability of the material, to improve the heat resistance, and to reduce costs. Examples of such materials are polyethylene (PE), polypropylene (PP), polystyrene (PS), ABS, SBS, SEBS, polycarbonate (PC), etc. may be mentioned. Further, polyethylene, polypropylene, and other olefin copolymers, their maleic acid modified products, or their glycidyl group introduced products. The polymer composition according to the present invention may further include additives generally mixed into a polymer formulation such as fillers, carbon, quartz powder, calcium carbonate, alumina, titanium oxide, etc. so long as not detracting from the above requirements of the air permeation coefficient and the Young's modulus.

Figure 2:
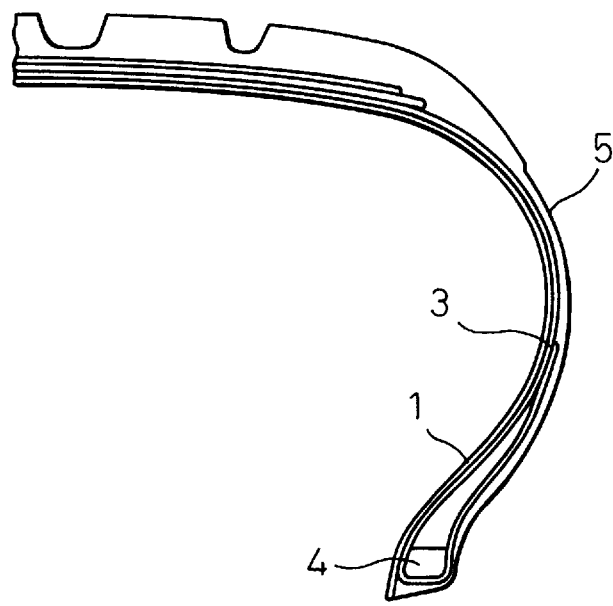
FIG. 2 is a substantially semi-sectional explanatory view in the meridial direction of one example of a pneumatic tire.

As shown in FIG. 2, which is a substantially semisectional explanatory view in the meridial direction of one example of a pneumatic tire according to the present invention, an air permeation preventive layer 1 comprising a film composed of a polymer composition containing a thermoplastic resin or a blend of a thermoplastic resin and an elastomer having an air permeation coefficient of not more than $25 \times 10^{-12}$ cc·cm/cm$^2$·sec·cmHg and a Young's modulus of 1 to 1000 MPa is arranged so as to substantially cover the entire inner circumferential surface of the carcass layer 3 provided between the pair of left and right bead cores 4, 4. Note that 5 represent a side wall portion.

Examples of the rubber usable as the other air permeation preventive layer of the pneumatic tire according to the present invention are any rubber generally used as the inner liner layer in the past, specifically, for example, butyl rubber, halogenated butyl rubber, etc.

Figure 3:
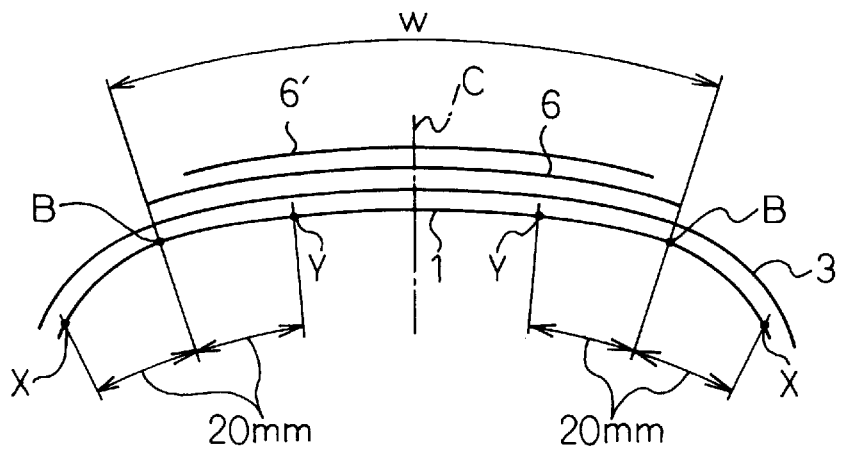
FIG. 3 is a view of the structure of an air permeation preventive layer of the belt portion of a pneumatic tire according to the first aspect of the present invention.

According to the first aspect of the present invention, there is provided a structure of a pneumatic tire as illustrated in, for example, FIG. 3 wherein an air permeation preventive layer 1 is an air permeation preventive layer comprised of a film composed of a polymer composition containing a thermoplastic resin or a blend thereof with an elastomer (hereinafter simply referred to as a film liner) and an air permeation preventive layer comprised of rubber (hereinafter simply referred to as a rubber liner). The film liner is arranged to substantially cover the inner surface of the tire from the positions B of the two ends of the widest belt 6 to the positions Y at least 20 mm (preferably 40 mm) in the direction of the crown center and at the crown center side of the positions X a maximum of 20 mm (preferably 15 mm) in the direction of the bead portion from the positions B of the two ends of the belt. The rest of the inner surface is covered by the rubber liner. Note that in FIG. 3, 3 shows a carcass and w shows the belt width.

Figure 4:
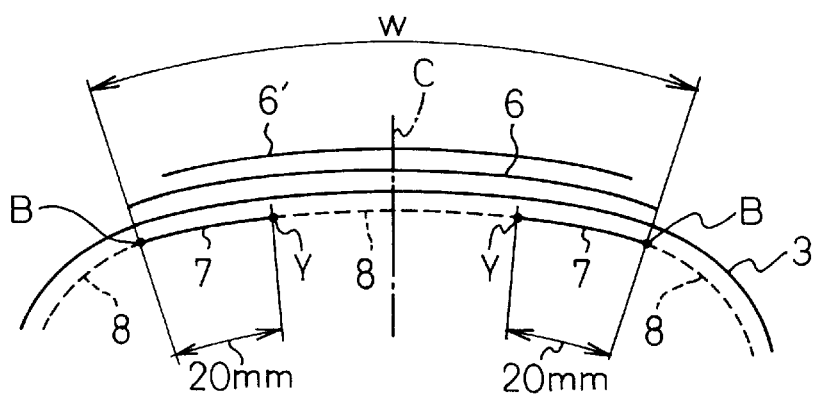
FIG. 4 is a view of the state of the least portion of use of a film liner in the air permeation preventive layer of a pneumatic tire according to the first aspect of the present invention.

Accordingly, as shown in FIG. 4, the film liner 7 is arranged so as to substantially cover the inner surface of the tire in the region from the two end portions B of the widest belt 6 to positions Y 20 mm in the direction of the crown center C so as to prevent oxygen deterioration of the belt ends at a minimum. A rubber liner 8 is arranged at the rest of the regions of the inner surface of the tire.

Figure 5:
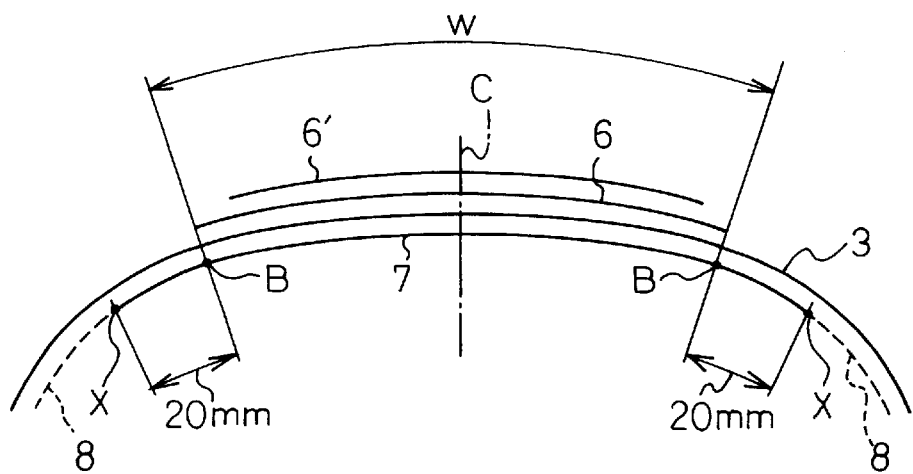
FIG. 5 is a view of the state of the most portion of use of a film liner in the air permeation preventive layer of a pneumatic tire according to the first aspect of the present invention.
Figure 6A:
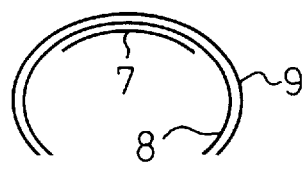
FIG. 6(A) to FIG. 6(F) are views (A) to (F) of several examples of the state of use of both of the air permeation preventive layer and tie rubber in a pneumatic tire according to the first aspect of the present invention.
Figure 6B:
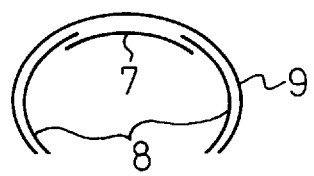
Figure 6C:
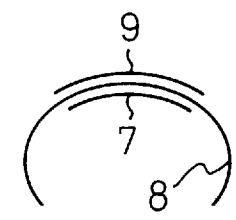
Figure 6D:
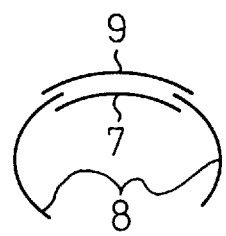
Figure 6E:
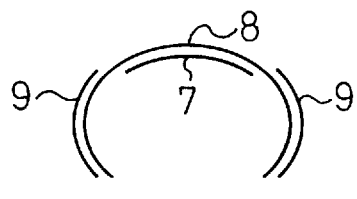
Figure 6F:
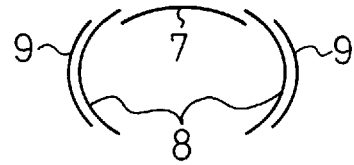

On the other hand, as shown in FIG. 5, the film liner 7 prevents to the maximum extent the fatigue damage of the film liner by being arranged so as to substantially cover the inner surface of the tire at the crown center side of the positions X 20 mm in the direction of the bead portion from the positions B of the two ends of the widest belt 6, while the rubber liner 8 is arranged at the rest of the region of the outside of the bead portion side from the positions X of the inner surface of the tire.

As explained above, according to the present invention, the air permeation preventive layer 1 is comprised of a combination of the film liner 7 and the rubber liner 8, and therefore, it is possible to lighten the weight of the pneumatic tire without detracting from the fatigue durability of the belt portion. The film liner 7 and the rubber liner 8 may be inside or outside of the carcass 3 so long as they are inside from the belt 6. Further, the connecting portion of the film liner 7 and the rubber liner 8 may be inside of either of the liners.

A conventionally generally used tie rubber layer may be arranged between the air permeation preventive layer and the carcass layer of the pneumatic tire according to the present invention. Further, the air permeation preventive layer according to the present invention may be multiple layer in configuration. The total thickness of the air permeation preventive layer including the tie rubber layer however must be not more than 1.2 mm.

Several examples of the combinations of the air permeation preventive layer (film liner 7 and rubber liner 8) and tie rubber layer 9 of the pneumatic tire according to the present invention are schematically shown in (A) to (F) of FIG. 6. Note that the tie rubber layer may include those conventionally used in the past. For example, foam rubber formulated from a dinitroso compound or other foaming agent and a urea foaming adjuvant may be exemplified.

The air permeation preventive layer of the pneumatic tire according to the second aspect of the present invention may be arranged at the inside of the carcass layer at the inside of the tire. It prevents permeation and diffusion of air from the inside of the tire whereby the air pressure in the tire for a long time can be maintained.

In FIG. 2, which is a semi-sectional view in the meridial direction showing a typical example of the arrangement of the air permeation preventive layer of the pneumatic tire, a carcass layer 3 bridges a pair of left and right bead cores 4, 4. The air permeation preventive layer 1 is provided at the inner surface of the tire at the inside of the carcass layer 3. This air permeation preventive layer 1 is composed of a thermoplastic film having uneven projections in the present invention.

Explaining the method of manufacturing a pneumatic tire having an air permeation preventive layer composed of a thermoplastic film having unevenness on its surface according to the present invention taking as an example the case of arranging the air permeation preventive layer at the inside of the carcass layer 3 as shown in FIG. 2, either one or more types of a thermoplastic resin having an action of preventing air permeation are fabricated into a single or multiple layers of flat thermoplastic film by general extrusion etc. or for example inflation molding is used to produce a single or multiple layer cylindrical thermoplastic film.

Next, the extruded single or multiple layers of flat or cylindrical thermoplastic film are laminated by an ordinary method on the rubber material for the tire so that the thermoplastic film constituting the air permeation preventive layer becomes the innermost side. Note that in the case of a cylindrical film, the cylindrical film is fit on the drum for molding the tire at the time of molding the green tire by cutting and supplying the necessary amount on the drum. This cylindrical thermoplastic film may be wound up once on a roll etc. and supplied on the molding drum-at the time of molding the green tire. On the cylindrical thermoplastic film fit over the molding drum are laid the carcass, sides, belt, tread, and rest of the tire members. This laminate is inflated as usual to produce the green tire which can then be vulcanized and made integral to produce a pneumatic tire.

According to the second aspect of the present invention, unevenness is provided on the outer surface of the bladder for vulcanization of the tire. This is used to form unevenness on the surface of the air permeation preventive layer of the thermoplastic film at the innermost side of the green tire. This unevenness may be provided over substantially the entire surface of the inner liner layer, but must at least be provided at the portions where the repeated strain given during tire use is large, for example, the air permeation preventive layer 1 at the inner surface of the the side wall portion 5. The unevenness of the thermoplastic film forming the air permeation preventive layer according to the present invention may be peaks or grooves of a height (or depth) of 0.1 to 2.0 mm, preferably 0.5 to 1.0 mm. If this height is less than 0.1 mm, the desired tracking effect may not be obtained, while conversely if over 2 mm, a large strain concentration will occur at the corners of the unevenness etc. and cracks may easily form from those portions. Note that the patterns of unevenness may be any shape such a circles, ellipses, pebbling, lattice-like grooves, slanted grooves, etc. or any combination thereof. Further, the portions becoming the corners of the inner liner layer preferably should be made a sufficient R-shape to enable the inner liner layer to change in shape following the deformation of the tire at the time of use, and therefore, reduce the load on the film material itself.

In general, the tread portion is protected by the high rigidity belt layer. Further, the bead portion is protected by the high rigidity bead filler. Accordingly, the repeated strain becomes large at the wide wall portion from the belt end to the front of the bead filler. In particular, the repeated strain at the side wall portion in the range of 0.5H to 0.65H with respect to the tire sectional height H becomes especially large.

FIG. 7(A) to FIG. 7(E) are schematic views showing several examples of patterns of unevenness of the surface of the bladder 16 used for producing the pneumatic tire of the present invention. As illustrated, any pattern may be used. Further, FIG. 8(A) and FIG. 8(B) are views of sections of the tires produced, wherein 10 shows the surface layer of the pneumatic tire and 1 shows the air permeation preventive layer.

The pneumatic tire according to the second aspect of the present invention, as shown in FIG. 9, must have the portion of the surface of the air permeation preventive layer in the range 14 between the intersection Q of the with the inner surface of the tire at the position of 0.5H with respect to the tire sectional height H of the pneumatic tire 12 and the intersection P with the inner surface of the tire at the position of 0.65H at least covered by an uneven film as shown in FIG. 9. According to the second aspect of the present invention, it is preferable that the uneven portion extend over a wide region in the radial direction from the range 14 of 0.5H to 0.65H of the tire side portion. Of course, this uneven film may be arranged over the substantially the entire air permeation preventive layer.

In FIG. 10, the elongation of shape ($E_1$) in a predetermined direction of the film layer between P and Q is defined as (L−Lo)/Lo where the tire is cut in a predetermined direction, the curve parallel to the carcass layer in that section is drawn between P and Q (PQ=Lo), and the actual length of the film between P and Q is defined as L. When the section is in the circumferential direction, the curve connecting the center of the carcass cord is used as the curve of the carcass layer. The real film length may be found by cutting the film material from the tire and spreading it flat or by measuring the length of the uneven curves on the tire sectional view. Next, this portion of the tire material is cut off from the tire and spread flat. The length of the film between P and Q in the flat state is defined as $L_1$. The film material is stretched in the circumferential direction and radial direction until breaking. The length of the film between P and Q when the film breaks is defined as $L_2$. The elongation of the material $E_2$ is defined as $(L_2-L_1)/L_1$.

The $E_1+E_2$ at this time is found for the circumferential direction and the sectional direction. This is defined as the real elongation at break. According to the present invention, this elongation ($E_1$) is preferably at least 5% in both of the radii of the circumferential direction and radial direction and preferably at least 10%. Further, when the shape elongation is 0% (film is flat), the elongation of the material must be at least 15%. At this time, in all cases, the real elongation at break must be at least 15% or else the air permeation preventive layer will not be able to follow the movement of the tire and there will be problems in durability. One over 30% is preferred. Note that, in FIG. 10, 12 shows a pneumatic tire, 3 shows a carcass layer, and 13 shows the inner surface of a tire.

The material of the rubber layer to which the air permeation preventive layer is laminated according to the second aspect of the present invention is not particularly limited. Any rubber material which has been generally used in the past as a rubber material for tires may be used. Examples of such a rubber may include a rubber composition comprising NR, IR, BR, SBR, or another diene rubber, a halogenated butyl rubber, an ethylene-propylene copolymer rubber, a styrene elastomer, etc. to which carbon black, process oil, vulcanizers, and other additives have been added.

Figure 11:
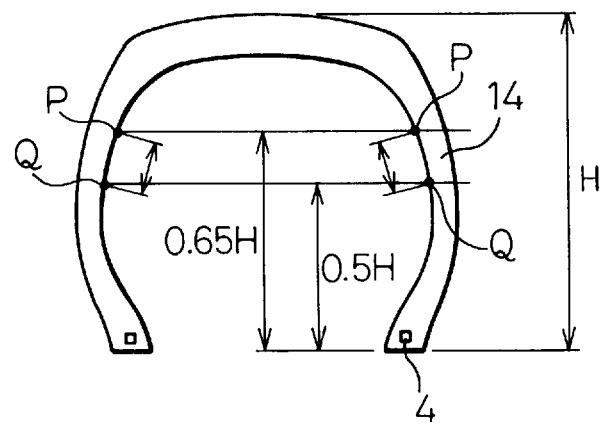
FIG. 11 is a view of the range 0.5H to 0.65H for making the distance t between the carcass cord in the carcass layer and air permeation preventive layer of the tire side portion according to the third aspect of the present invention not less than 0.3 mm.
Figure 12:
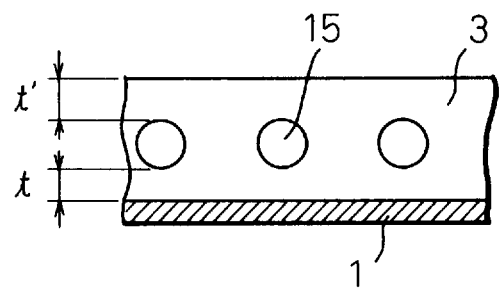
FIG. 12 is a view of the position of the distance t between the carcass cord in the carcass layer and air permeation preventive layer of the tire side portion according to the third aspect of the present invention.

According to the third aspect of the present invention, the thermoplastic resin or thermoplastic resin/elastomer is made into a film and the distance t between the carcass cord 15 and the air permeation preventive layer 1 is made at least 0.3 mm, preferably 0.3 to 0.5 mm, as shown in FIG. 12, for example, at the tire side portion 14 at least in the range of 0.5H to 0.65H of the tire sectional height H shown in FIG. 11. The distance t of less than 0.3 mm is not preferable in view of the durability.

Note that to ensure that the distance t between the carcass cord 15 in the carcass layer 3 and the air permeation preventive layer 1 is at least 0.3 mm, butyl rubber, tie rubber, butyl rubber and tie rubber, or another rubber layer may be inserted between the carcass layer 3 and the air permeation preventive layer 1 in the range of at least 0.5H to 0.65H. In this case, the thickness of the rubber layer is preferably at least 0.5 mm in view of the moldability. Note that the rubber layer may, for example, be a foamed rubber formulated by a dinitroso compound or other foaming agent and a urea foaming adjuvant.

Further, the gauge of the carcass cord may be made thicker. In this case, it is preferable that t>t' (see FIG. 12) from the viewpoint of lightening the weight.

Above, an explanation was given of the case where the air permeation preventive layer was at the inside of the carcass, but the air permeation preventive layer may also be arranged at the outside of the carcass layer sandwiching the rubber layer. Further, the air permeation preventive layer may be a multiple layer so long as the above conditions are satisfied as a whole.

EXAMPLES

The present invention will now be explained in further detail by Examples, but of course the scope of the present invention is not limited to these Examples.

Examples I-1 to I-10, Comparative Examples I-1 to I5, and Standard Example I-1

As shown in Table I-1, polymer films comprised of the materials A to E, rubber comprised of the material F, and tie rubber (material: natural rubber, butadiene rubber, and styrene-butadiene rubber and other blends) were used to fabricate tires having the air permeation preventive layer of the configuration shown in Table I-1 (size: 165SR13, rim size: 13×41/2-J). The following tests were conducted on these tires and the tire of Standard Example I-1.

However, these tires all used the material F (butyl rubber) for the air permeation preventive layer in the range of 0.5H to 0.65H of the the tire sectional height H, and therefore, the real elongation at break was far larger than 15%, and therefore, the air permeation preventive layer in this portion did not break in the durability test.

The results are shown in Table I-1.

Test Method of Durability of Air Permeation Preventive Layer

The tire was run under the following conditions, then the air permeation preventive layer was examined. When cracks, peeling, blisters, or other trouble were observed, the tire was rated defective (x), when none at all were recognized, good (◎), and when trouble of an extent not posing a substantial problem occurred, "○".

Running conditions: Fill air into tire at pressure of 140 kPa using standard rim prescribed by JATMA and run tire on a 1707 mm drum at a room temperature of 38° C. and a speed of 80 km/h for 10,000 km.

Test Method for Belt Cord Rubber Deterioration

Oxygen was filled into a tire at a pressure of 350 kPa using a standard rim prescribed by the JATMA, the tire allowed to deteriorate at a temperature of 70° C. for 14 days, then samples were taken of the rubber at the belt end between the No. 1 belt and No. 2 belt and the modulus $M_{100}'$ at the time of 100% elongation was measured. The percentage of the modulus thereof and the next product [Modulus $M_{100}'$ after oxygen deterioration]/[Modulus $M_{100}$ of time of new product] ×100 was found and used as the index of deterioration of the belt rubber. The index of deterioration of belt rubber shows a larger deterioration the larger the value. That is, the index of deterioration of the belt cord is better the smaller the value (one close to 100 better)

Test Method for Moldability

At the time of molding the tire, the case where the material ended up elongating was rated as "defective" (x) and the case of no elongation was rated as "good" (◎). Note that the allowable lower limit was (○).

Test Method for Air Leakage

A tire is allowed to stand for three months under conditions of an initial pressure of 200 kPa, a room temperature of 21° C., and no-load. The intervals between measurement of the internal pressure was made 4 days. The value a was found by regression to the following formula:

$$Pt/Po = exp(-\alpha t)$$

where Pt is the measurement pressure, Po is the initial pressure, and t is the number of elapsed days. The obtained value α is used and t=30 (days) inserted to obtain:

$$\beta = [1 - exp(-\alpha t)] \times 100$$

The value β is made the rate of pressure loss (%/month) per month.

TABLE I-1

| | Ex. I-1 | Ex. I-2 | Ex. I-3 | Ex. I-4 | Ex. I-5 | Ex. I-6 | Ex. I-7 | Ex. I-8 | Ex. I-9 | Ex. I-10 |
|---|---|---|---|---|---|---|---|---|---|---|
| Material of film-like air permeation preventive layer | A | B | C | D | E | A | A | A | A | |
| Thickness of film-like air permeation preventive layer (mm) | 0.02 | 0.02 | 0.02 | 0.02 | 0.02 | 1.2 | 0.02 | 0.02 | 0.02 | 0.02 |
| Range of film-like air permeation preventive layer | Range of 20 mm from two ends of belt to direction of crown center (FIG. 4) | Range of 20 mm from two ends of belt to direction of crown center (FIG. 4) | Range of 20 mm from two ends of belt to direction of crown center (FIG. 4) | Range of 20 mm from two ends of belt to direction of crown center (FIG. 4) | Range of 20 mm from two ends of belt to direction of crown center (FIG. 4) | Renge of 20 mm from two ends of belt to direction of crown center (FIG. 4) | Range from position 20 mm from belt end in direction of bead portion to crown center (FIG. 5) | Range from position 20 mm from belt end in direction of bead portion to crown center (FIG. 5) | Range from position 20 mm from belt end in direction of bead portion to crown center (FIG. 5) | Range from position 20 mm from belt end in direction of bead portion to crown center (FIG. 5) |
| Thickness of rubber air permeation preventive layer (material F) (mm) | 0.5 | 0.5 | 0.5 | 0.5 | 0.5 | 0.5 | 0.5 | 0.5 | 0.5 | 0.5 |
| Range of air permeation preventive layer (material F) | Full surface except range of film-like air permeation preventive layer | Full surface except range of film-like air permeation preventive layer | Full surface except range of film-like air permeation preventive layer | Full surface except range of film-like air permeation preventive layer | Full surface except range of film-like air permeation preventive layer | Full surface except range of film-like air permeation preventive layer | Full surface except range of film-like air permeation preventive layer | Full surface except range of film-like air permeation preventive layer | Full surface except range of film-like air permeation preventive layer | Full surface |
| Thickness of the rubber layer (mm) | 0.7 | 0.7 | 0.7 | 0.7 | 0.7 | 0.7 | 0.7 | 0.7 | 0.7 | 0.6 |
| Range of tie rubber layer | Same as rubber air permeation preventive layer | Same as rubber air permeation preventive layer | Same as rubber air permeation preventive layer | Same as rubber air permeation preventive layer | Same as rubber air permeation preventive layer | Same as rubber air permeation preventive layer | Same as rubber air permeation preventive layer | Same as rubber air permeation preventive layer | Full surface | Full surface |
| Durability of air permeation preventive layer | ◎ | ◎ | ◎ | ◎ | ◎ | ◎ | ◎ | ○ | ◎ | ◎ |
| Index of deterioration of belt cord rubber | 124 | 120 | 116 | 102 | 101 | 105 | 122 | 104 | 122 | 117 |
| Moldability | ○ | ○ | ○ | ○ | ○ | ◎ | ○ | ○ | ○ | ○ |
| Rate of pressure loss (%/mo) | 2.7 | 2.7 | 2.6 | 2.6 | 2.6 | 2.6 | 2 | 1.8 | 2 | 1.9 |
| Tire mass (kg) | 6.94 | 6.94 | 6.94 | 6.94 | 6.94 | 7.00 | 6.68 | 6.68 | 6.81 | 6.96 |

TABLE I-1-continued

| | Comp. Ex. I-1 | Comp. Ex. I-2 | Comp. Ex. I-3 | Comp. Ex. I-4 | Comp. Ex. I-5 | Prior Ex. I-1 |
|---|---|---|---|---|---|---|
| Material of film-like air permeation preventive layer | A | E | A | C | A | |
| Thickness of film-like air permeation preventive layer (mm) | 0.02 | 0.02 | 0.02 | 0.01 | 1.3 | |
| Range of film-like air permeation preventive layer | Range from position 30 mm from belt end in direction of bead portion to crown center | Range from position 30 mm from belt end in direction of bead portion to crown center | Range of 10 mm from two ends of belt to direction of crown center | Range of 20 mm from two ends of belt to direction of crown center | Range from position 20 mm from belt end in direction of bead portion to crown center (FIG. 5) | |
| Thickness of rubber air permeation preventive layer (material F) (mm) | 0.5 | 0.5 | 0.5 | 0.5 | 0.5 | 0.5 |
| Range of air permeation preventive layer (material F) | Full surface except range of film-like air permeation preventive layer | Full surface except range of film-like air permeation preventive layer | Full surface except range of film-like air permeation preventive layer | Full surface except range of film-like air permeation preventive layer | Full surface except range of film-like air permeation preventive layer | Full surface |
| Thickness of tie rubber layer (mm) | 0.7 | 0.7 | 0.7 | 0.7 | 0.7 | 0.7 |
| Range of tie rubber layer | Same as rubber air permeation preventive layer | Same as rubber air permeation preventive layer | Same as rubber air permeation preventive layer | Same as rubber air permeation preventive layer | Same as rubber air permeation preventive layer | Full surface |
| Durability of air permeation preventive layer | x | x | ⊚ | ⊚ | ⊚ | ⊚ |
| Index of deterioration of belt cord rubber | 122 | 101 | 137 | 128 | 104 | 137 |
| Moldability | ○ | ○ | ○ | x | ⊚ | ⊚ |
| Rate of pressure loss (%/mo) | 2.6 | 2.5 | 2.7 | 2.7 | 2.6 | 2.7 |
| Tire mass (kg) | 6.90 | 6.90 | 7.00 | 6.93 | 7.07 | 7.00 |

As the materials A to F shown in Table I-1, the following configuration was used.

1) Material A: Material comprised of 50 parts of nylon MXD6 (MXD6) (Reny 6002 made by Mitsubishi Gas Chemical), 90.5 parts of a Master Batch A (100 parts of butyl rubber bromide: Exxon Bromobutyl 2244 made by Exxon Chemical, 60 parts of carbon black GPF: Sheast V made by Tokai Carbon, 1 part of stearic acid, 10 parts of petroleum hydrocarbon resin: Escorez 1102 made by Esso, and 10 parts of paraffin process oil), 1.5 part of zinc white, 0.5 part of DM, and 0.3 part of sulfur with an air permeation coefficient of $1.02 \times 10^{-12}$ cc·cm/cm²·sec·cmHg and a Young's modulus of 128 MPa.

2) Material B: Material comprised of 28 parts of nylon 6 (N6) (CM4061 made by Toray), 37.8 parts of nylon MXD6 (MXD6) (Reny 6002 made by Mitsubishi Gas Chemical), 48.9 parts of Master Batch A (100 parts of butyl rubber bromide: Exxon Bromobutyl 2244 made by Exxon Chemical, 60 parts of carbon black GPF: Sheast V made by Tokai Carbon, 1 part of stearic acid, 10 parts of petroleum hydrocarbon resin: Escolet 1102 made by Esso, and 10 parts of paraffin process oil), 1.5 part of zinc white, 0.5 part of DM, and 0.3 part of sulfur with an air permeation coefficient of $0.84 \times 10^{-12}$ cc·cm/cm²·sec·cmHg and a Young's modulus of 287 MPa.

3) Material C: Material comprised of 25.2 parts of nylon 6 (N6) (CM4061 made by Toray), 37.8 parts of nylon MXD6 (MXD6) (Reny 6002 made by Mitsubishi Gas Chemical), 27.0 parts of Br-(polyisobutylene-p-methylstyrene) (EXX-PRO 89-4 made by Exxon Chemical), and 10 parts of nylon 6/nylon 66/nylon 610 (CM4001 made by Toray) with an air permeation coefficient of $0.63 \times 10^{-12}$ cc·cm/cm²·sec·cmHg and a Young's modulus of 317 MPa.

4) Material D: EVOH (Evaaal EPE153B made by Kuraray, air permeation coefficient of $0.052 \times 10^{-12}$ cc·cm/cm²·sec·cmhg and a Young's modulus of 1020 MPa)

5) Material E: Nylon MXD6 (MXD6) (Reny 6002 made by Mitsubishi Gas Chemical with air permeation coefficient of $0.019 \times 10^{-12}$ cc·cm/cm²·sec·cmHg and a Young's modulus of 1550 MPa)

6) Material F: Butyl rubber (air permeation coefficient of $55 \times 10^{-12}$ cc·cm/cm²·sec·cmHg and a Young's modulus of 15 MPa)

Example I-1 is an example of provision of a film-like air permeation preventive layer of a material of thickness of 0.02 mm and provision of a rubber air permeation preventive layer in the rest of the range and where a tie rubber layer is inserted in the range where the rubber air permeation preventive layer is provided. Example I-2 is an example where, compared with Example I-1, the material of the film-like air permeation preventive layer is changed from the material A to the material B. Example I-3 is an example where, compared with Example I-1, the material of the film-like air permeation preventive layer is changed from the material A to the material C. Example I-4 is an example where, compared with Example I-1, the material of the film-like air permeation preventive layer is changed from the material A to the material D. Example I-5 is an example where, compared with Example I-1, the material of the film-like air permeation preventive layer is changed from the material A to the material E. Even though the material E is used, the range of the film-like air permeation preventive layer does not go beyond the belt ends, and therefore, there is no problem with the durability of the film-like air permeation preventive layer (see Example I-8 and Comparative Example I-2). Example I-6 is an example where, compared with Example I-1, the thickness of the film-like air permeation preventive layer is changed from 0.02 mm to 1.2 mm. Example I-7 is an example where, compared with Example I-1, the range of the film-like air permeation preventive layer is changed. There is almost no difference in deterioration of the belt cord rubber compared with Example I-1, but the pressure loss and tire mass become smaller. Example I-8 is an example where, compared with Example I-1, the range of the film-like air permeation preventive layer is made broader and the material is changed from the material A to the material E. If the range of the film-like air permeation preventive layer is made broader when the material E is used, trouble occurs (see Example I-5 and Comparative Example I-2). Example I-9 is an example of provision of the tie rubber layer not only in the range of the rubber air permeation preventive layer but also the film-like air permeation preventive layer. The rubber air permeation preventive layer is provided in the range outside the film-like air permeation preventive layer. Example I-10 is an example where the rubber air permeation preventive layer and the tie rubber layer are provided over the entire surface and the film-like air permeation preventive layer is provided as well. The deterioration of the belt cord rubber and the pressure loss are small and the thickness of the tie rubber layer is made smaller than the prior art example, so the tire mass becomes smaller as well.

Comparative Example I-1 is an example of use of the material A for the film-like air permeation preventive layer and provision of the same in a range considerably exceeding the belt end. Since it extends to the side portion where the deformation is large at the time of tire use, the durability becomes poor (x). Comparative Example I-2 is an example of the use of a material E for the film-like air permeation preventive layer and the provision in a range greatly exceeding the belt ends. Since it extends up to the side portions where the deformation is great at the time of tire use, the durability becomes poor (x). Comparative Example I-3 is an example where the range of use of the film-like air permeation preventive layer is narrow, so the effect of improvement of the deterioration of the belt cord rubber, pressure loss, and reduction of weight do not appear. Comparative Example I-4 is an example where the thickness of the film-like air permeation preventive layer is made 0.01 mm. Since the thickness of the film-like air permeation preventive layer is small, the moldability is poor (x). Comparative Example I-5 is an example where the thickness of the film-like air permeation preventive layer is made 1.3 mm. Since the thickness of the film-like air permeation preventive layer is large, the mass of the tire is increased.

Note that Prior Example I-1 is an example of a conventional tire using rubber for the air permeation preventive layer.

Example II-1

Lattice grooves of a depth of 1 mm and a pitch of 3 mm were cut into the entire surface of a mold cavity for a bladder for tire vulcanization. Rubber for bladder use was injection molded in the mold and vulcanized to fabricate a bladder for tire vulcanization.

Next, at the time of molding the tire, a strip-like three-layer film of a thickness of 0.09 mm obtained by laminating polypropylene (thickness of 0.02 mm) on the two sides of vinylidene chloride (thickness 0.05 mm) was used as an inner liner material. This was wrapped around a drum for tire molding. On the top thereof, the tire members were laminated and these inflated to obtain a green tire. For the vulcanization of the green tire, the above bladder was used and vulcanization performed at 185° C., 15 minutes, and pressure 2.3 MPa to mold a tire of a tire size of 165SR13.

Example II-2

The formulation shown in Table II-1, that is, the resin, rubber material, and cross-linking formulation necessary for dynamic cross-linking were mixed by a biaxial kneader and extruder, extruded in a strand form, cooled, then pelletized using a resin pelletizer, then was extruded by a T-die using an ordinary 40 mm single shaft resin extruder to fabricate a strip-like film of a width of 360 mm width and 0.1 mm thickness. This was wrapped around the drum for molding the tire. The tire member was laid on top of this to form an inner layer and obtain a green tire.

This green tire was vulcanized using a bladder similar to that of Example II-1 to mold a tire of the tire size 165SR13.

TABLE II-1

| Component | Part by weight |
|---|---|
| N6*[1] | 50 |
| MXD6*[2] | |
| Br-IPMS*[3] | 50 |
| GPF*[4] | 30 |
| Paraffinic process oil | 10 |
| Zinc white | 0.25 |

TABLE II-1-continued

| Component | Part by weight |
|---|---|
| Stearic acid | 1 |
| Zinc stearate | 0.5 |

*[1]: Toray Amilan CM1041
*[2]: Mitsubishi Gas Chemical Reny 6002
*[3]: Bromide of paramethylene and isobutylene copolymer, XP-50 90-10, made by Exxon Chemical.
*[4]: Carbon black, made by Tokai Carbon, Sheast V.

Example II-3

0.2 mm deep pebbling was given to the entire surface of a mold cavity for a bladder for tire vulcanization, a bladder was made in the same way as Example II-1, and the bladder was used to fabricate a tire using a film similar to that of Example II-1 as an inner liner.

Example II-4

Lattice grooves of 0.5 mm depth and 3 mm pitch were cut into the entire surface of the mold cavity for a bladder for tire vulcanization, rubber for the bladder was injection molded in the mold to fabricate a bladder for tire vulcanization, and this was used to fabricate a tire using a film similar to that of Example II-1 as an inner liner.

Comparative Example II-1

A normally used bladder (with grooves for release of air of a pitch of 30 mm and depth of 1 mm) was used to fabricate a tire using a film similar to that of Example 1 as an inner liner.

Evaluation Experiments

These tires were cut in the circumferential direction and sectional direction to measure how much the length of the inner liner layer changed compared with the case of no unevenness. Further, these tires were subjected to indoor endurance tests after which the states of the inner liner portions were examined. The results are shown in Table II-2.

TABLE II-2

| | | Length of inner liner portion in circumferential direction | | | Length of inner liner portion in radial direction | | | |
|---|---|---|---|---|---|---|---|---|
| Ex. no. | Bladder unevenness | Elongation of shape $E_1$ (%) | Elongation of material $E_2$ (%) | Real elongation of break (%) | Elongation of shape $E_1$ (%) | Elongation of material $E_2$ (%) | Real elongation of break (%) | Examination of endurance test |
| Ex. II-1 | Lattice grooves | 10 | 11 | 21 | 32 | 12 | 44 | No abnormalities |
| Ex. II-2 | Lattice grooves | 12 | 233 | 245 | 33 | 250 | 283 | No abnormalities |
| Ex. II-3 | Pebbling | 22 | 10 | 32 | 46 | 11 | 57 | No abnormalities |
| Ex. II-4 | Pebbling | 5 | 10 | 15 | 12 | 15 | 27 | No abnormalities |
| Comp. Ex. II-1 | Long grooves (30 mm pitch, 1 mm depth) | 1 | 10 | 11 | 2 | 12 | 14 | Cracks in inner liner |

*[1]: 165SR13 steel radial tire (rim 13 × 4½-J) was used and run under conditions of an air pressure of 140 kPa × a load of 5.5 kN at a room temperature of 38° C. on a φ1,707 mm drum at a speed of 80 km/h. After running 10,000 km, the inner surface of the tire was examined. Tires where the following problems were found in a visual examination of the inner liner layer failed to pass the test:
1) Fissures, cracks
2) Peeling, blistering

Examples III-1 to III-11, Comparative Examples III-1 to III-7, and Standard Examples III-1 to III-2

Polymer films comprised of the following materials G to J were used to fabricate tires having air permeation preventive layers of the configuration shown in Table III-1 (size: 165SR13, rim size: 13×41/2-J). The following tests were conducted on these tires.

Material G: A material comprised of 28 parts of nylon 6 (N6) (CM4061 made by Toray), 42 parts of nylon MXD6 (MXD6) (Reny 6002 made by Mitsubishi Gas Chemical), 30 parts of maleic acid modified ethylene propylene rubber (M-EPM), and 0.18 part of methylene dianiline with an air permeation coefficient of $2.13 \times 10^{-12}$ cc·cm/cm²·s·cmHg and a Young's modulus of 257 MPa.

Material H: A material comprised of 25.2 parts of N6, 37.8 parts of MXD6, 48.9 parts of Master Batch A (100 parts of butyl rubber bromide: Exxon Bromobutyl 2244 made by Exxon Chemical, 60 parts of carbon black GPF: Sheast V made by Tokai Carbon, 1 part of stearic acid, 10 parts of petroleum hydrocarbon resin: Escolet 1102 made by Esso, and 10 parts of paraffin process oil), 10 parts of Hizex Million 240M (EEA), 1.5 part of zinc white, 0.5 part of DM, and 0.3 part of sulfur with an air permeation coefficient of $0.84 \times 10^{-12}$ cc·cm/cm²·s·cmHg and a Young's modulus of 244 MPa.

Material I: A material comprised of 25.2 parts of N6, 37.8 parts of MXD6, 27.0 parts of Br-(polyisobutylene-p-methylstyrene) (EXXPRO 89-4 made by Exxon Chemical), and 10 parts of nylon 6/nylon 66/nylon 610 (CM4001 made by Toray) with an air permeation coefficient of $0.63 \times 10^{-12}$ cc·cm/cm²·s·cmHg and a Young's modulus of 317 MPa.

Material J: Butyl rubber (with air permeation coefficient of $55 \times 10^{-12}$ cc·cm/cm²·s·cmHg and a Young's modulus of 15 MPa)

Durability of Air Permeation Preventive Layer

Under the following dry heat deterioration conditions and following running conditions, the case of damage to the air permeation preventive layer was made "defective" (x) and the case of no damage "good" (o).

(1) Dry heat deterioration conditions: Fill oxygen in tire at pressure of 350 kPa and allow tire to deteriorate at temperature of 70° C. for 14 days.

(2) Running conditions: Fill air into tire at pressure of 170 kPa using standard rim prescribed by JATMA, give camber angle of −2° on drum of 1707 mm, and run at speed of 60 km/h for 100 hours. Give as a load 75±24% of the maximum load capacity prescribed by the JATMA by a 0.03 Hz sine wave and simultaneously give a slip angle of ±3° by a waveform shifting in phase by 180°.

Test Method of Moldability

At the time of molding the tire, the case where the material ended up elongating was made "defective" (x) and the case of no elongation was made "good" (o).

Rate of Pressure Loss

A tire is allowed to stand for three months under conditions of an initial pressure of 200 kPa, a room temperature of 21° C., and no-load. The intervals between measurement of the internal pressure was made 4 days. The value α was found by regression to the following formula:

$$Pt/Po = exp(-\alpha t)$$

where Pt is the measurement pressure, Po is the initial pressure, and t is the number of elapsed days. The obtained value α is used and t=30 (days) inserted to obtain:

$$\beta = [1 - exp(-\alpha t)] \times 100$$

The value β is made the rate of pressure loss (%/month) per month.

Measurement Method of Distance t Between Carcass Cord and Air Permeation Preventive Layer The side portion of a tire is cut in the circumferential direction and in the range of 50 mm width of that section the shortest distance $t_1$–$t_n$ from the surface of the carcass cord at the air permeation preventive layer side to the surface of the air permeation preventive layer at the carcass cord side is measured. The average value is made the distance t between the carcass cord and the air permeation preventive layer.

$$t = \frac{\sum_{i=1}^{n} t_i}{n}$$

The results are shown in Table III-1.

TABLE III-1

| | Ex. III-1 | Ex. III-2 | Ex. III-3 | Ex. III-4 | Ex. III-5 | Ex. III-6 | Ex. III-7 | Ex. III-8 | Ex. III-9 | Comp. Ex. III-6 | Comp. Ex. III-7 |
|---|---|---|---|---|---|---|---|---|---|---|---|
| Material of air permeation preventive layer outside range of 0.5H to 0.65H of tire sectional height H | G | H | I | H | H | H | H | H | H | I | I |
| Thickness of air permeation preventive layer outside range of 0.5H to 0.65H of tire sectional height H (mm) | 0.02 | 0.02 | 0.02 | 1.1 | 0.02 | 0.02 | 0.02 | 0.02 | 0.02 | 0.02 | 0.02 |
| Material of air permeation preventive layer in range of 0.5H to 0.65H of tire sectional height H | G | H | I | H | H | H | H | H | H | E | Same as Ex. III-1, 3-layer film |
| Thickness of air permeation preventive layer in range of 0.5H to 0.65H of tire sectional height H (mm) | 0.02 | 0.02 | 0.02 | 1.1 | 0.02 | 0.02 | 0.02 | 0.02 | 0.02 | 0.02 | 0.02 |
| Young's modulus of air permeation preventive layer in range of 0.5H to 0.65H of tire sectional height H (MPa) | 257 | 244 | 317 | 244 | 244 | 244 | 244 | 244 | 244 | 1550 | 203 |
| Real elongation at break in circumferential direction (%) | 348 | 360 | 291 | 360 | 360 | 360 | 360 | 360 | 360 | 236 | 12 |
| Real elongation at break in radial direction (%) | 404 | 483 | 340 | 483 | 483 | 483 | 483 | 483 | 483 | 279 | 15 |
| Thickness of tie rubber layer (mm) | 0.5 | 0.5 | 0.5 | 0.2 | 0.2 | 0.5 | 0.3 | 0.0 | 0.0 | 0.5 | 0.5 |
| Thickness of butyl rubber layer (mm) | 0.0 | 0.0 | 0.0 | 0.0 | 0.0 | 0.2 | 0.0 | 0.0 | 0.0 | 0.0 | |
| Position defining t dimension (tread side) | 0.65H | 0.65H | 0.65H | 0.65H | 0.65H | — | — | — | — | 0.65H | 0.65H |
| Position defining t dimension (bead side) | 0.5H | 0.5H | 0.5H | 0.5H | 0.5H | — | — | — | — | 0.5H | 0.5H |
| t dimension inside above range (mm) | 0.6 | 0.6 | 0.6 | 0.3 | 0.3 | 0.6 | 0.6 | 0.6 | — | 0.6 | 0.6 |
| t dimension inside above range (mm) | 0.1 | 0.1 | 0.1 | 0.1 | 0.1 | 0.1 | 0.1 | 0.1 | — | | |
| t' dimension (mm) | 0.1 | 0.1 | 0.1 | 0.1 | 0.1 | | | | | | |
| Durability af air permeation preventive layer | ○ | ○ | ○ | ○ | Δ | ○ | ○ | ○ | ○ | x | x |
| Moldability | ○ | ○ | ○ | Δ | Δ | ○ | ○ | ○ | ○ | ○ | ○ |
| Rate of pressure loss (%/mo) | 2.7 | 1.5 | 1.1 | 0.03 | 1.5 | 1.5 | 1.3 | 1.1 | 1.5 | 0.9 | 1.2 |
| Tire mass (kg) | 6.45 | 6.45 | 6.45 | 7.0 | 6.39 | 6.63 | 6.63 | 6.63 | 6.57 | 6.45 | 6.43 |

TABLE III-1-continued

| | Ex. III-10 | Ex. III-11 | Comp. Ex. III-1 | Comp. Ex. III-2 | Comp. Ex. III-3 | Comp. Ex. III-4 | Comp. Ex. III-5 | Standard Ex. III-1 | Standard Ex. III-2 |
|---|---|---|---|---|---|---|---|---|---|
| Material of air permeation preventive layer outside range of 0.5H to 0.65H of tire sectional height H | H | H | H | H | H | H | H | H | J |
| Thickness of air permeation preventive layer outside range of 0.5H to 0.65H of tire sectional height H (mm) | 0.02 | 0.02 | 0.01 | 1.2 | 0.02 | 0.02 | 0.02 | 0.02 | 0.5 (butyl) |
| Material of air permeation preventive layer in range of 0.5H to 0.65H of tire sectional height H | H | H | H | H | H | H | H | H | J |
| Thickness of air permeation preventive layer in range of 0.5H to 0.65H of tire sectional height H (mm) | 0.02 | 0.02 | 0.01 | 1.2 | 0.02 | 0.02 | 0.02 | 0.02 | 0.5 |
| Young's modulus of air permeation preventive layer in range of 0.5H to 0.65H of tire sectional height H (MPa) | 244 | 244 | 244 | 244 | 244 | 244 | 244 | 244 | 15 |
| Real elongation at break in circumferential direction (%) | 360 | 360 | 360 | 360 | 360 | 360 | 360 | 360 | 820 |
| Real elongation at break in radial direction (%) | 483 | 483 | 483 | 483 | 483 | 483 | 483 | 483 | 814 |
| Thickness of tie rubber layer (mm) | 0.5 | 0 | 0.0 | 0.0 | 0.0 | 0.0 | 0.1 | 0.0 | 0.7 |
| Thickness of butyl rubber layer (mm) | 0.0 | 0 | 0.0 | 0.0 | 0.0 | 0.0 | 0.0 | 0.0 | 0.5 |
| Position defining t dimension (tread side) | 0.65H | — | 0.65H | 0.65H | 0.6H | 0.55H | 0.65H | — | — |
| Position defining t dimension (bead side) | 0.5H | — | 0.5H | 0.5H | 0.5H | 0.55H | 0.5H | — | — |
| t dimension inside above range (mm) | 0.6 | — | 0.6 | 0.6 | 0.6 | 0.6 | 0.2 | — | — |
| t dimension inside above range (mm) | 0.1 | 0.3 | 0.1 | 0.1 | 0.1 | 0.1 | 0.1 | — | 1.3 |
| t' dimension (mm) | 0.1 | 0.1 | 0.1 | 0.1 | 0.1 | 0.1 | 0.1 | 0.1 | |
| Durability of air permeation preventive layer | ○ | ○ | ○ | ○ | x | x | x | x | ○ |
| Moldability | ○ | ○ | x | ○ | ○ | ○ | x | ○ | ○ |
| Rate of pressure loss (%/mo) | 1.5 | 1.5 | 2.5 | 0.03 | 1.5 | 1.5 | 1.5 | 1.5 | 2.7 |
| Tire mass (kg) | 6.63 | 6.46 | 6.4 | 7.05 | 6.45 | 6.45 | 6.38 | 6.63 | 7.0 |

Note that as the materials of the tie rubber layer and the butyl rubber layer, mixtures of the following kneaded at ordinary temperature and processed into sheets were used.

|  | Parts by weight |
|---|---|
| Formulation of tie rubber layer | |
| NR (SMR-20) | 70 |
| SBR (1502) | 30 |
| Zinc white | 4.0 |
| Stearic acid | 2.0 |
| Antioxidant | 1.0 |
| Tackifier | 1.0 |
| Carbon black (N660) | 60 |
| Aroma oil | 10 |
| Sulfur | 2.0 |
| Vulcanization accelerator (NS) | 1.0 |
| Formulation of butyl rubber layer | |
| Brominated butyl rubber | 80 |
| NR (SMR-20) | 20 |
| Stearic acid | 1.0 |
| Tackifier | 3.0 |
| Carbon black (N660) | 60 |
| Aroma oil | 5.0 |
| Sulfur | 1.0 |
| Zinc white | 4.0 |
| Vulcanization accelerator (DM) | 1.0 |

INDUSTRIAL APPLICABILITY

As explained above, according to the first aspect of the present invention, since the amount of air (oxygen) passing through the belt portion is reduced, the oxygen deterioration of the belt cord rubber is reduced, the durability of the belt portion is improved, and there is no need for making the air permeation preventive layer comprised of the rubber a thickness considering the lift of the secondary molding. Further, since the air permeation preventive layer comprised of a specific resin or resin/rubber can be made thinner in gauge than one of rubber, lightening of the weight becomes possible. In addition, since an air permeation preventive layer comprised of a resin or resin/rubber is not used at side parts with a large deformation, but rather an air permeation preventive layer made of rubber is used, the effect is achieved of prevention of occurrence of trouble due to fatigue.

According to the second aspect of the present invention, since a thermoplastic film having unevenness on the surface is used as the inner liner layer, the problem of the prior art of the film not being able to sufficiently follow the repeated deformation at the time of tire use, and therefore, the occurrence of a large number of cracks in the film and risk of reduction of the sealability of air is solved, and it is possible to provide a pneumatic tire having excellent retention of air pressure without cracks occurring due to the repeated deformation at the time of tire use when a thermoplastic film is used as the inner liner layer.

Since a rubber gauge for easing the local strain is ensured between the air permeation preventive layer comprised of a plastic or thermoplastic resin/elastomer and carcass layer, it is possible to prevent damage to the air permeation preventive layer. Further, the air permeation preventive layer comprised of the above specific materials can be made smaller in air permeation coefficient and thinner than the conventional air permeation preventive layer, and therefore it is possible to lighten the pneumatic tire.

Note that from the comparison of Example III-5 and Example III-10, the thickness of the rubber layer inserted between the carcass layer and air permeation preventive layer is preferably made at least 0.5 mm from the viewpoint of the moldability. Also, from the comparison of Example III-11 and Example III-9, when the carcass cord gauge is made thicker, making just the side contacting the air permeation preventive layer is preferable in the sense of lightening the weight.

We claim:

1. A pneumatic tire having a belt layer having circumferentially extending end portions on either side thereof, an air permeation preventive layer inside of said belt layer with respect to a tread portion of said tire and comprising a film composed of a polymer composition containing a thermoplastic resin or a blend of a thermoplastic resin and an elastomer component and having an air permeation coefficient of not more than $25 \times 10^{-12}$ cc·cm/cm$^2$·sec·cmHg and a Young's modulus of 1 to 1000 MPa, said air permeation preventive layer being arranged so as to substantially cover an inner circumferential surface of the tire in at least two regions, each region extending from a first position at one of the two end portions of the belt layer to a second position 20 mm in from one of said first positions and toward a crown center of the tire and at most in a region extending between two third positions, each of which is 20 mm out from one of said first positions and toward a bead portion of the tire.

2. The pneumatic tire of claim 1, wherein said film is composed of a thermoplastic resin.

3. The pneumatic tire of claim 2, wherein said thermoplastic resin is at least one resin selected from the group consisting of a polyamide resin, a N-alkoxyalkylate of a polyamide resin, a polyester resin, a polynitrile resin, a polymethacrylate resin, a polyvinyl resin, a cellulose resin, a fluoro resin, and an imide resin.

4. The pneumatic tire of claim 1, wherein said film is composed of a blend of a thermoplastic resin and an elastomer component, wherein said thermoplastic resin is at least one resin selected from the group consisting of a polyamide resin, a N-alkoxyalkylate of a polyamide resin, a polyester resin, a cellulose resin, a fluoro resin and an imide resin.

5. A pneumatic tire having a belt layer having circumferentially extending end portions on either side thereof, a first air permeation preventive layer inside of said belt layer with respect to a tread portion of said tire and comprising a film composed of a polymer composition containing a thermoplastic resin or a blend of a thermoplastic resin and an elastomer component and having an air permeation coefficient of not more than $25 \times 10^{-12}$ cc·cm/cm$^2$·sec·cmHg and a Young's modulus of 1 to 1000 MPa, said first air permeation preventive layer being arranged so as to substantially cover an inner circumferential surface of the tire in at least two regions, each region extending from a first position at one of the two end portions of the belt layer to a second position 20 mm in from one of said first positions and toward a crown center of the tire and at most in a region extending between two third positions, each of which is 20 mm out from one of said first positions and toward a bead portion of the tire, and a second air permeation preventive layer having an actual elongation at break of at least 15% in a circumferential direction and in a radial direction of the tire at two side portions on the inside of either side of the tire, said two side portions extending at least from a position 0.5H to a position 0.65H, where H is a sectional height of the tire.

6. The pneumatic tire of claim 5, wherein the second air permeation preventive layer at the two side portions of the tire between the positions 0.5H and 0.65H is a layer of rubber.

7. The pneumatic tire of claim 5, wherein the second air permeation preventive layer at the two side portions of the tire between the positions 0.5H and 0.65H is a film composed of said polymer composition, said second air permeation preventive layer at said side portions being provided with unevenness on its surface so as to make the amount of elongation of shape of the second air permeation preventive layer in the circumferential direction and in the radial direction between the positions 0.5H and 0.65H of the tire at least 5% and to make the amount of elongation of the layer at least 10%.

8. The pneumatic tire of claim 7, wherein the length in the circumferential direction and the length in a sectional direction of the second air permeation preventive layer provided with the unevenness are both at least 5% larger than the lengths in the case of no unevenness and the height of the unevenness is 0.1 to 2.0 mm.

9. The pneumatic tire of claim 5, wherein said film is composed of a thermoplastic resin.

10. The pneumatic tire of claim 9, wherein said thermoplastic resin is at least one resin selected from the group consisting of a polyamide resin, a N-alkoxyalkylate of a polyamide resin, a polyester resin, a polynitrile resin, a polymethacrylate resin, a polyvinyl resin, a cellulose resin, a fluoro resin, and an imide resin.

11. The pneumatic tire of claim 5, wherein said film is composed of a blend of a thermoplastic resin and an elastomer component, wherein said thermoplastic resin is at least one resin selected from the group consisting of a polyamide resin, a N-alkoxyalkylate of a polyamide resin, a polyester resin, a cellulose resin, a fluoro resin and an imide resin.

12. A pneumatic tire having a belt layer having circumferentially extending end portions on either side thereof, a first air permeation preventive layer inside of said belt layer with respect to a tread portion of said tire and comprising a film composed of a polymer composition containing a thermoplastic resin or a blend of a thermoplastic resin and an elastomer component and having an air permeation coefficient of not more than $25 \times 10^{-12}$ cc·cm/cm²·sec·cmHg and a Young's modulus of 1 to 1000 MPa, said first air permeation preventive layer being arranged so as to substantially cover an inner circumferential surface of the tire in at least two regions, each region extending from a first position at one of the two end portions of the belt layer to a second position 20 mm in from one of said first positions and toward a crown center of the tire and at most in a region extending between two third positions, each of which is 20 mm out from one of said first positions and toward a bead portion of the tire, and a second air permeation preventive layer comprising a film composed of said polymer composition of said first air permeation preventive layer and having an air permeation coefficient of not more than $25 \times 10^{-12}$ cc·cm/cm²·sec·cmHg and a Young's modulus of 1 to 350 MPa at two side portions on the inside of either side of the tire, said two side portions extending at least from a position 0.5H to a position 0.65H, where H is a sectional height of the tire, wherein said tire includes a carcass layer containing a carcass cord and a thickness t of rubber between the carcass cord of the carcass layer and the second air permeation preventive layer at least at said side portions of the tire between the positions 0.5H to 0.65H of the tire is at least 0.3 mm.

13. The pneumatic tire of claim 12, wherein said films are composed of a thermoplastic resin.

14. The pneumatic tire of claim 13, wherein said thermoplastic resin is at least one resin selected from the group consisting of a polyamide resin, a N-alkoxyalkylate of a polyamide resin, a polyester resin, a polynitrile resin, a polymethacrylate resin, a polyvinyl resin, a cellulose resin, a fluoro resin, and an imide resin.

15. The pneumatic tire of claim 12, wherein said films are composed of a blend of a thermoplastic resin and an elastomer component, wherein said thermoplastic resin is at least one resin selected from the group consisting of a polyamide resin, a N-alkoxyalkylate of a polyamide resin, a polyester resin, a cellulose resin, a fluoro resin and an imide resin.

* * * * *